Inventor:
Charles A. Thomas,
by Prowell & Mack
His Attorney.

Patented Nov. 23, 1948

2,454,581

UNITED STATES PATENT OFFICE 2,454,581

DYNAMOELECTRIC MACHINE

Charles A. Thomas, Fort Wayne, Ind., assignor to General Electric Company, a corporation of New York Application September 28, 1946, Serial No. 700,152

10 Claims. (Cl. 322—92)

My invention relates to dynamoelectric machines and particularly to an arrangement for improving the sensitivity and speed of response of an armature reaction excited dynamoelectric machine.

An object of my invention is to provide an improved armature reaction excited dynamoelectric machine.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
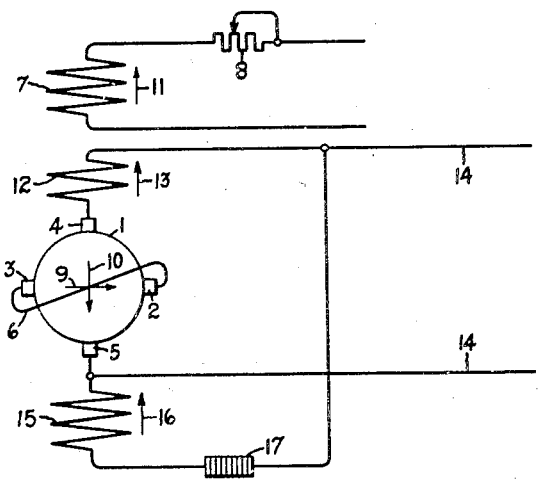
Figure 2:
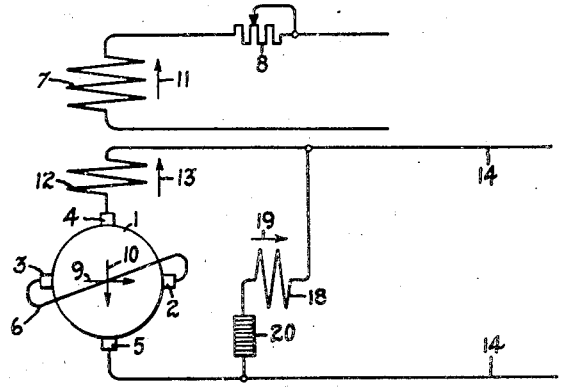

The drawing schematically illustrates in Fig. 1 an armature reaction excited dynamoelectric machine provided with an embodiment of my invention for increasing the sensitivity and speed of response thereof; and Fig. 2 schematically shows another embodiment of my invention.

Referring to the drawing, I have shown in Fig. 1 a dynamoelectric machine of the armature reaction excited type which includes a rotatable member or armature 1 having a commutator with a conventional winding connected thereto and a set of commutator primary brushes 2 and 3 and a set of commutator secondary brushes 4 and 5 displaced about the commutator substantially 90 electrical degrees from the primary brush set. The primary brushes 2 and 3 are connected together in the illustrated machine by a short-circuiting shunt conductor 6 to provide a primary or short circuit through the armature. As in a conventional machine of this type, a control field exciting winding 7 is provided which may be energized by any suitable source of electrical power supply connected across its terminals to provide energizing current thereto which may be controlled by any suitable arrangement, such as a variable resistor 8.

In this type machine, the control field exciting winding 7 induces a voltage between the primary brushes 2 and 3, such that a primary or short-circuit current flows through the armature primary circuit which provides a primary component of armature reaction indicated by an arrow 9. This component of armature reaction induces a voltage between the secondary brushes 4 and 5 which will cause a current to flow through the secondary circuit of the armature when a load is connected to these brushes. This flow of current through the armature secondary circuit will produce a secondary component of armature reaction as indicated by the arrow 10 in opposition to the control component of excitation indicated by the arrow 11. In order to minimize the effect of secondary armature reaction on the control of the machine, a compensating field exciting winding 12 is provided which is energized in response to the secondary current of the machine by being connected in series with the secondary brush 4. This compensating field exciting winding 12 is adapted to produce a component of excitation along the secondary commutating axis of the machine as indicated by the arrow 13 in opposition to the secondary component of armature reaction 10, so as substantially to neutralize the secondary armature reaction. In this arrangement, the terminal of the compensating field exciting winding 12 and the other terminal of the machine connected to the secondary brush 5 are adapted to be connected to any suitable load through conductors 14.

The sensitivity and speed of response of the machine are adapted to be greatly increased by the provision of an auxiliary control field exciting winding 15 which is energized in response to the secondary voltage of the machine to provide a component of excitation, indicated by the arrow 16, cumulative to that of the control field exciting winding 7 along the secondary commutating axis of the machine. This energization of the winding 15 is obtained by connecting it across the terminal of the secondary brush 5 and the terminal of the compensating field exciting winding 12 through a nonlinear negative voltage-resistance characteristic resistor 17. A resistor of this type has the characteristic that when placed in circuit with a source of electric potential its resistance falls with an increase of potential in the circuit, the change of resistance being independent of temperature change. Such a resistor is described in Patent 1,822,742, McEachron, assigned to the assignee of the present application, and is commonly referred to as a Thyrite resistance. The resistor 17 is adapted inherently to vary the energization of the auxiliary control field exciting winding 15 nonlinearly for providing relatively large increments of changes of excitation with changes in the secondary or output voltage of the machine. This inherent nonlinear variation of the resistance of the circuit of the auxiliary control field exciting winding 15 in the same sense as variations in the secondary voltage of the machine is such that as the voltage of the machine is increased by increased excitation provided by the main separately excited control field exciting winding 7, the total control excitation of the machine is greatly increased by the excitation provided by the cumulative auxiliary field exciting winding 18, whereas when the voltage decreases, the effective resistance of the Thyrite resistor 19 greatly increases until at low voltages or at residual voltage of the machine, the excitation provided by the auxiliary field winding 18 is very small. A slight reversal of the energization of the main control field exciting winding 7 may be used to reduce the secondary or output voltage of the machine substantially to zero. In this manner, the response of the machine is greatly increased and the sensitivity thereof also is increased.

In Fig. 2, I have shown another embodiment of my invention applied to a dynamoelectric machine of the armature reaction excited type provided with a rotatable member or armature 1 similar to that of Fig. 1 and other corresponding parts to which reference numerals have been given corresponding to the same numbered parts in Fig. 1. The armature 1 is provided with a commutator connected to a conventional armature winding, and a set of primary commutator brushes 2 and 3 are arranged in contact with the commutator and substantially short circuited in the illustrated arrangement by a conductor 6 to provide a primary or short circuit through the armature. A set of secondary brushes 4 and 5 is provided and is displaced about the commutator substantially 90 electrical degrees from the primary brush set and adapted to be connected to any suitable load circuit through terminal leads 14. As in a conventional machine of this type, a control field exciting winding 7 is provided which may be energized by any suitable source of electrical power supply connected across the terminals to provide energizing current thereto which may be regulated in any desirable manner, as by a variable resistor 8.

With such an arrangement, the control field exciting winding 7 is adapted to induce a voltage between the short circuit primary brushes 2 and 3 such that a primary current flows through the armature primary winding and provides a primary component of armature reaction, as indicated by the arrow 9. This component of armature reaction induces a voltage between the secondary brushes 4 and 5 which will cause a current to flow through the secondary circuit of the armature when it is connected to a load through the leads 14. This flow of current through the armature secondary circuit produces a secondary component of armature reaction, as indicated by the arrow 10, in opposition to the control component of excitation indicated by the arrow 11 and provided by the field exciting winding 7. In order to minimize the effect of secondary armature reaction on the control of the machine, a compensating field exciting winding 12 is provided which is energized in response to the secondary current of the machine by being connected in series with the secondary brush 4. This compensating field exciting winding 12 is adapted to produce a component of excitation, indicated by the arrow 13, in opposition to the secondary component of armature reaction 10 so as substantially to neutralize the effect of this secondary armature reaction.

The sensitivity and speed of response of the machine may be increased by the provision of an auxiliary control field exciting winding 18 which is energized in response to the secondary voltage of the machine to provide a component of excitation, indicated by the arrow 19, cumulative to the primary armature reaction 9 along the primary commutating axis of the machine for inducing a cumulative component of voltage to that resulting from the excitation provided by the main control field exciting winding 7. This auxiliary field exciting winding 18 is adapted to be energized through a nonlinear negative voltage-resistance characteristic resistor 20, such as a Thyrite resistance, connected directly across the secondary or load terminals of the machine. The nonlinear resistor 20 is adapted inherently to vary the energization of the auxiliary control field exciting winding 18 in a manner similar to that explained with respect to the field exciting winding 18 and the resistor 17 in Fig. 1 so as to increase the sensitivity and the speed of response of the machine to variations of the excitation provided by the main control field exciting winding 7.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine having an armature with a commutator and a winding connected thereto, means including a commutator primary brush set and a commutator secondary brush set for respectively providing a primary circuit and a secondary circuit through said armature winding, a field exciting winding arranged to provide a component of excitation along the secondary commutating axis of said armature, means including a second field exciting winding for substantially neutralizing armature reaction due to current in said armature secondary circuit, means including a third field exciting winding for providing a component of excitation along the primary commutating axis of said machine cumulative to armature reaction due to current in said armature primary circuit and arranged to be energized in response to the voltage of said secondary circuit, and means including a nonlinear negative voltage-resistance characteristic resistance connected in series with said third field exciting winding.

2. A dynamoelectric machine having an armature with a commutator and a winding connected thereto, means including a commutator primary brush set and a commutator secondary brush set for respectively providing a primary circuit and a secondary circuit through said armature winding, a field exciting winding arranged to provide a component of excitation along the secondary commutating axis of said armature, means including a second field exciting winding for substantially neutralizing armature reaction due to current in said armature secondary circuit, means including a third field exciting winding for providing a component of excitation along the secondary commutating axis of said machine cumulative to said first-mentioned field exciting winding and arranged to be energized in response to the voltage of said secondary circuit, and means including a nonlinear negative voltage-resistance characteristic resistance connected in series with said third field exciting winding.

3. A dynamoelectric machine having an armature with a commutator and a winding connected thereto, means including a commutator primary brush set and a commutator secondary brush set for respectively providing a primary circuit and a secondary circuit through said armature winding, a field exciting winding arranged to provide a component of excitation along the secondary commutating axis of said armature, means including a second field exciting winding for opposing armature reaction due to current in said armature secondary circuit, means including a third field exciting winding for providing a component of excitation along the secondary commutating axis of said machine cumulative to said first-mentioned field exciting winding and arranged to be energized in response to the voltage of said secondary circuit, and means including a negative voltage-resistance characteristic resistance connected in series with said third field exciting winding for providing relatively large increments of change in excitation with changes in secondary voltage of said machine.

4. A dynamoelectric machine having an armature with a commutator and a winding connected thereto, means including a commutator primary brush set and a commutator secondary brush set for respectively providing a primary circuit and a secondary circuit through said armature winding, a field exciting winding arranged to provide a component of excitation along the secondary commutating axis of said armature, means including a second field exciting winding for opposing armature reaction due to current in said armature secondary circuit, means including a third field exciting winding for providing a component of excitation along the secondary commutating axis of said machine cumulative to said first-mentioned field exciting winding and arranged to be energized in response to the secondary voltage of said machine, and means including a nonlinear negative voltage-resistance characteristic resistance connected in series with said third field exciting winding inherently varying the energization thereof nonlinearly for providing relatively large increments of change in excitation with changes in voltage of said machine.

5. A dynamoelectric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means including a second field exciting winding for providing a component of excitation along the secondary commutating axis of said machine for substantially neutralizing the secondary armature reaction of said machine, means including a third field exciting winding for providing a component of excitation along the secondary commutating axis of said machine cumulative to said first-mentioned field exciting winding and arranged to be energized in response to the voltage of said secondary circuit, and means for inherently and nonlinearly varying the resistance of the circuit of said third field exciting winding in the same sense as variations in the secondary voltage of said machine.

6. A dynamoelectric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means including a second field exciting winding for providing a component of excitation along the secondary commutating axis of said machine for substantially neutralizing the secondary armature reaction of said machine, means including a third field exciting winding for providing a component of excitation along the secondary commutating axis of said machine cumulative to said first-mentioned field exciting winding and adapted to be energized in response to the voltage of said secondary circuit, and means for nonlinearly varying the resistance of the circuit of said third field exciting winding for larger changes in resistance with larger variations in the secondary voltage of said machine.

7. A dynamoelectric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means including a second field exciting winding for providing a component of excitation along the secondary commutating axis of said machine in opposition to the secondary armature reaction of said machine, means including a third field exciting winding for providing a component of excitation along the secondary commutating axis of said machine cumulative to said first-mentioned field exciting winding and arranged to be energized in response to the secondary voltage of said machine, and means including a nonlinear negative voltage-resistance characteristic resistance connected in series with said third field exciting winding inherently varying the energization thereof nonlinearly for providing relatively large increments of change in excitation with changes in voltage of said machine.

8. A dynamoelectric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means including a second field exciting winding for providing a component of excitation along the secondary commutating axis of said machine for substantially neutralizing the secondary armature reaction of said machine, means including a third field exciting winding for providing a component of excitation along the secondary commutating axis of said machine cumulative to said first-mentioned field exciting winding and arranged to be energized in response to the voltage of said secondary circuit, and means for varying the resistance of the circuit of said third field exciting winding in the same sense as variations in the secondary voltage of said machine.

9. A dynamoelectric machine having an armature with a commutator and a winding connected thereto, means including a commutator primary brush set and a commutator secondary brush set for respectively providing a primary circuit and a secondary circuit through said armature winding, a field exciting winding arranged to provide a component of excitation along the secondary commutating axis of said armature, means including a second field exciting winding for opposing armature reaction due to current in said armature secondary circuit, means including a third field exciting winding for providing a component of excitation along the primary commutating axis of said machine for inducing a cumulative component of voltage to that resulting from said first-mentioned field exciting winding excitation and arranged to be energized in response to the voltage of said secondary circuit, and means including a negative voltage-resistance characteristic resistance connected in series with said third field exciting winding for providing relatively large increments of change in excitation with changes in secondary voltage of said machine.

10. A dynamoelectric machine having a rotatable member with a winding and a commutator connected thereto, a set of primary brushes and a set of secondary brushes displaced about said commutator from said primary brushes for providing a primary circuit and a secondary circuit respectively through said rotatable member winding, a field exciting winding arranged to provide a component of excitation along the secondary commutating axis of said machine, means including a second field exciting winding for providing a component of excitation along the secondary commutating axis of said machine for substantially neutralizing the secondary armature reaction of said machine, means including a third field exciting winding for providing a component of excitation to said machine for inducing a cumulative component of voltage to that resulting from said first-mentioned field exciting winding excitation and arranged to be energized in response to the voltage of said secondary circuit, and means including a nonlinear negative voltage-resistance characteristic resistance connected in series with said third field exciting winding for inherently and nonlinearly varying the resistance of the circuit of said third field exciting winding in the same sense as variations in the secondary voltage of said machine, whereby the response and sensitivity of said dynamoelectric machine is increased.

CHARLES A. THOMAS.

REFERENCES CITED

The following references are of record in the file of this patent:

UNITED STATES PATENTS

| Number | Name | Date |
|---|---|---|
| 1,161,661 | Hull et al. | Nov. 23, 1915 |